United States Patent [19]

Klimek, Jr. et al.

[11] Patent Number: 5,361,069

[45] Date of Patent: * Nov. 1, 1994

[54] AIRBORNE RADAR WARNING RECEIVER

[75] Inventors: Robert A. Klimek, Jr., Shalimar; Elias A. McCormac, III; Ronald R. Schambeau, both of Ft. Walton Beach, all of Fla.

[73] Assignee: The United States of America as represented by the Secretary of the Air Force, Washington, D.C.

[*] Notice: The portion of the term of this patent subsequent to Nov. 1, 2008 has been disclaimed.

[21] Appl. No.: 844,736

[22] Filed: Jul. 18, 1969

[51] Int. Cl.⁵ ............................................. G01S 7/40
[52] U.S. Cl. ................................................... 342/20
[58] Field of Search .................. 343/5, 5 A, 5 G, 5 C, 343/16, 17.1, 17.1 P, 17.1 R, 17.1 F, 17.2; 342/20

[56] References Cited

U.S. PATENT DOCUMENTS

| | | | |
|---|---|---|---|
| 2,522,551 | 9/1950 | Williams | 342/20 |
| 2,862,204 | 11/1958 | Henrici et al. | 342/20 |
| 3,229,283 | 1/1966 | Hefter et al. | 343/5 |
| 3,403,394 | 9/1968 | Rouault | 343/5 |
| 3,408,574 | 10/1968 | Schmidt et al. | 342/20 |
| 3,500,401 | 3/1970 | Miller et al. | 342/20 |

*Primary Examiner*—Thomas H. Tarcza
*Assistant Examiner*—Gilberto Barrón, Jr.
*Attorney, Agent, or Firm*—Jacob N. Erlich; Donald J. Singer

[57] ABSTRACT

An airborne radar warning receiver for track-while-scan radar including a first radar frequency receiver and logic circuitry for determining an increase in pulse rate frequency, second radar frequency receiver connected to a signal filter and an automatic gain control amplifier connected to the receiver and a logic circuitry connected to the amplifier and to the pulse rate frequency logic whereby the ratio is determined between the time from the start of scan until the radar beam illuminates the aircraft and the total scan time, thereby indicating the center of a search scan sector. A third radar frequency receiver connected to a signal filter and a logic circuitry connected to the receiver for indicating when signals are being radiated indicative of the launching of a radar controlled missile.

7 Claims, 5 Drawing Sheets

AIRBORNE RADAR WARNING RECEIVER

BACKGROUND OF THE INVENTION

The general approach in the field of track-while-scan radar systems has been to designate and scan a search sector. Some systems do this by employing two orthogonally mounted scanning antennas. Each antenna may radiate a beam which is 10° wide in one direction and 2° wide in the other, and scan a search sector 20° wide. Scanning generally is accomplished by electromechanically shifting the antenna beam while the antenna remains stationary, rather than by physically oscillating the antenna. The scans are unidirectional, i.e. when the beam reaches the right-hand end of its scan sector it is blanked and flies back to the left side to start the scan again. The usual scanning rate is 16 times/sec during which the beam may be energized for 50 milliseconds and blanked for 12.5 milliseconds during flyback. The location of an aircraft in the radar scan sector can be determined by measuring the time required for the main beam to scan from the edge of the scan sector to the aircraft.

Many systems are capable of engaging only one target at a time. In one particular system, operating doctrine requires that the radar operators align the target in the center of the scan sector. The operators rotate hand wheels which control the antenna array and move ;he scanned sector so that the target return signal is maintained at the sector center. With regard to tracking, an automatic angle tracking circuit provides only for automatic tracking within the scanned sector. The antenna is not slaved automatically, therefore the angle tracking operators must position the antenna manually to keep the target at the center of the scanned sector.

SUMMARY OF THE INVENTION

This invention relates generally to airborne warning receivers, and more particularly to an airborne warning receiver which indicates when an aircraft has entered a search scanning sector, and further, when the aircraft has reached the center of the sector, either in azimuth or elevation.

The instant invention indicates to the airborne radar observer or pilot when the aircraft is in the center of a search scan sector. Some prior art devices suggest the use of a display of continuous sector position, as for example, a meter display, thus requiring that the ,display be continually monitored with no means to alert the observer when he is in the center of the sector in case he should be busy with other activities in the aircraft. The instant invention provides visual means which will attract the attention of the observer when the aircraft enters the sector, when it reaches the center of the search sector, and further, when the aircraft is being attacked.

The warning receiver circuitry of this invention detects centering in the azimuth beam or elevation beam to provide specific positional information or alternatively to indicate that the aircraft is located within the mutual azimuth and elevation radar scan sector. A warning receiver which would detect centering in elevation, in addition to azimuth, is considered undesirable because the operators may track low altitude targets off-center in elevation. This is done to facilitate early missile entry into the sector and eliminate ground clutter when launching a missile to attack an aircraft.

An object of this invention is then to provide an airborne warning system which will given an instant indication when the aircraft enters a ground based track-while-scan radar sector.

It is a further object of this invention to provide an airborne warning system which will indicate the center of a track-while-scan sector.

It is another object of this invention to provide an air-borne warning system which will indicate the angular position of an aircraft within the track-while-scan sector with respect to the track-while-scan sector.

It is still another object of this invention to provide a new and improved means for detecting and indicating when an aircraft is in a mutual azimuth and elevation radar scan sector.

It is still a further object of this invention to provide a new and improved means for providing an instant indication when an aircraft is being attacked.

These and other advantages, features and objects of the invention will become more apparent from the following description taken in connection with the illustrative embodiments in the accompanying drawings, wherein:

DESCRIPTION OF THE PREFERRED EMBODIMENTS

Figure 1:
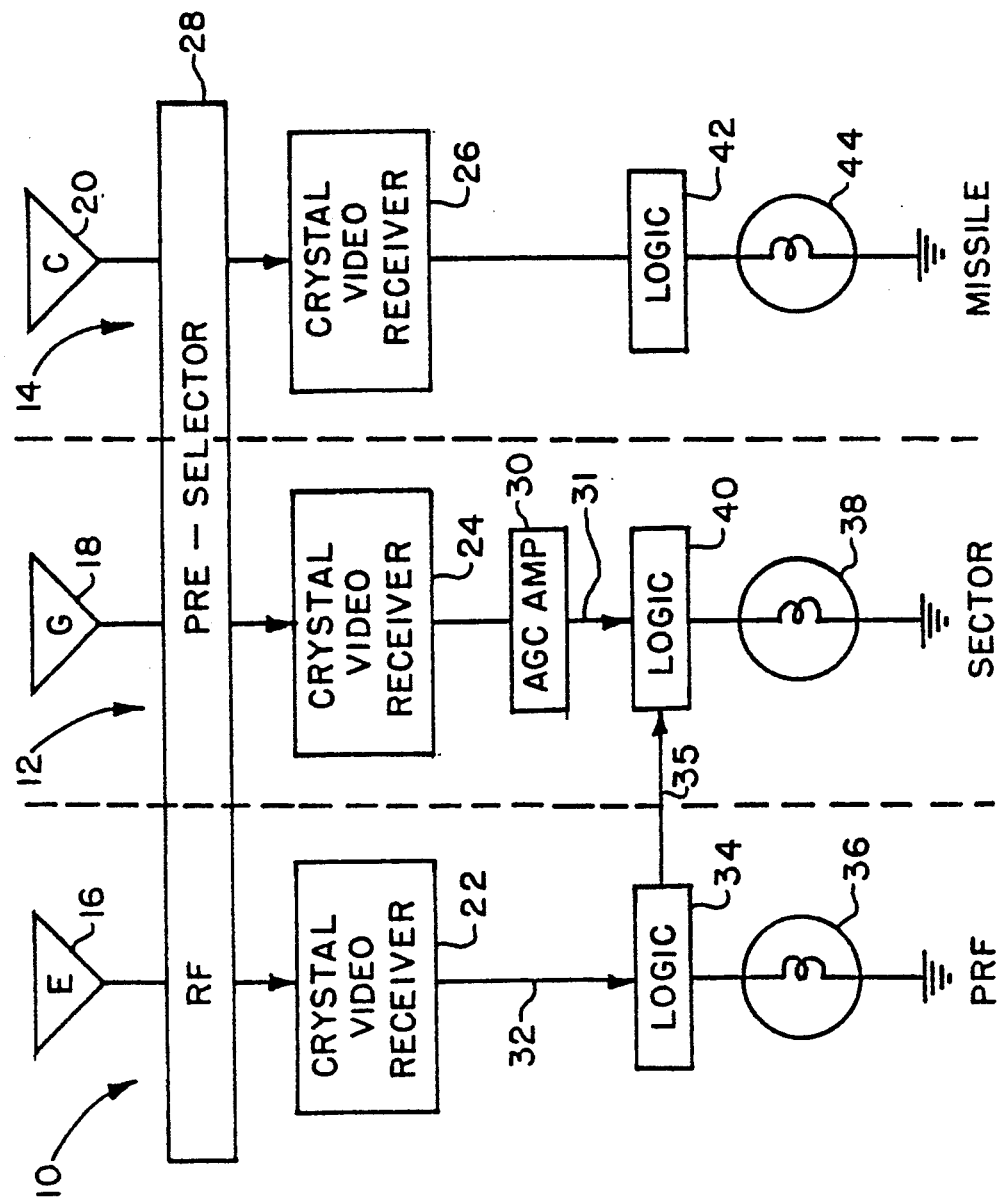
FIG. 1 is a block diagram of the airborne warning system of this invention.

Referring now to FIG. 1, generally the warning receiver consists of three sections, PRF detector 10, sector locator 12, and a guidance signal receiver 14. The signals for PRF detection (E band) and sector location (G band) are received with vertically polarized stub antennas 16 and 18 (although it is within the skill of the art to receive both signals by way of a single antenna) to aid in rejection of the horizontally polarized elevation beam. In the event the warning system is adapted to detect the vertical elevation beam sector, suitable horizontally polarized stub antennas are used. The missile guidance signals (C band) are received by a suitable antenna 20. The signals enter their crystal video receivers 22, 24 and 26 through preselector 28 which is designed to further discriminate against an elevation beam in the case of a horizontal search sector detector. The E band and G band could in practice utilize the same crystal video receiver, thereby saving space and weight. The outputs from the crystal video receiver 22 and the AGC amplifier 30 are processed as follows:

The output of the crystal video receiver in the form of video pulses is used to feed via lead 32 the PRF logic circuitry 34. Logic circuitry 34 is designed to detect when a radar of a particular frequency is operating in the high PRF mode. This logic circuitry is designed to accept PRF rates commensurate with the particular high PRF. This circuit activates the PRF light 36.

The sector light is activated by signals from the automatic gain control (AGC) and the PRF logic. The output level of the automatic gain control amplifier 30 is essentially constant. The AGC level is determined by the maximum received signal rather than the average, resulting in a gain which is determined by the magnitude of the main beam. The output is a clean representation of the main beam. Center sector locator logic 40 utilizes the output from the PRF logic circuitry 34 via lead 35 in addition to the output from the AGC amplifier 30 via lead 31 which lights the sector warning light 38. The output from PRF logic circuitry 34 is used to detect the beginning of the scan. For a particular radar the gate is opened 22.5 milliseconds later to accept the main beam signal from AGC amplifier 30. Coincidence will occur only if the aircraft is in the center of the radar sector which activates the sector light. The warning receiver may, for example, be calibrated to provide an indication within ±1.5° of the sector center.

The guidance receiver 26 detects the radar beacon interrogator pulses from the C band guidance transmitter when a missile has been launched. Each pulse is about one microsecond in duration. There is no transmission of these signals except when a missile has been launched. After launch, the pulses are transmitted continuously even during the "flyback" blanking period of the parent radar. A frequency filter 28 and logic 42 identical to that incorporated in the PRF logic circuitry is used to identify the radar guidance commands and activate the missile light 44.

Figure 2:
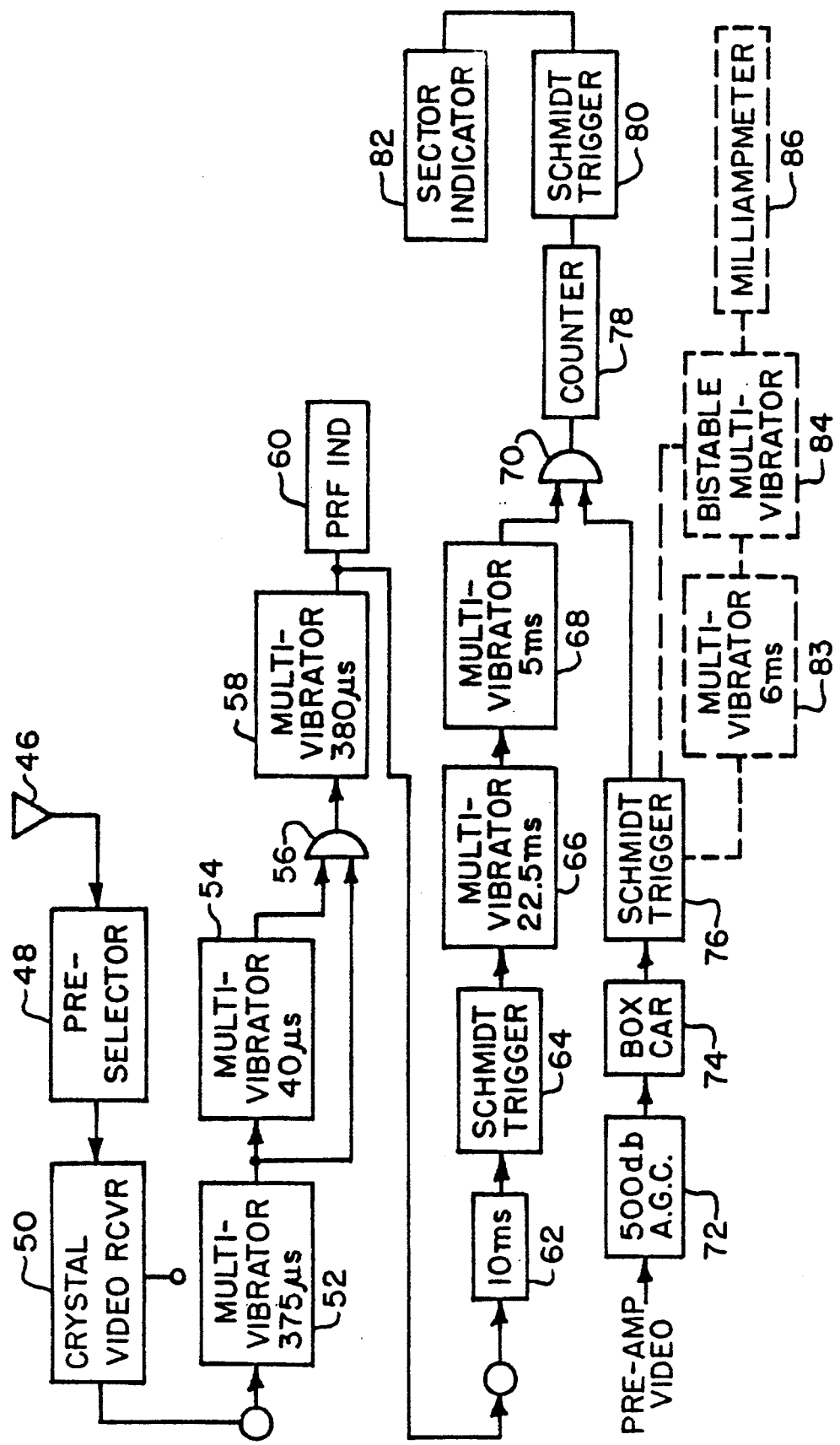
FIG. 2 is a block diagram of an embodiment of the invention.

Referring now to FIGS. 2 and B, the antenna 46 used is a quarter-wave vertically polarized stub. Vertical polarization is used to aid in rejection of the elevation beam frequency, however, if the elevation beam was to be detected, a horizontally polarized antenna would be used.

The preselector 48 is designed to have a pass band of 100 megacycles with steep "skirts" at the upper band edge in order to further discriminate against the elevation beam. A forward-biased crystal detector is an integral part of the preselector.

The crystal video 50 receiver is modified to provide a low level output from the second stage for use in the AGC amplifier. The tangential sensitivity of this receiver may be approximately −50 dbm. Saturation begins at signal levels in excess of −30 dbm.

Figure 3:
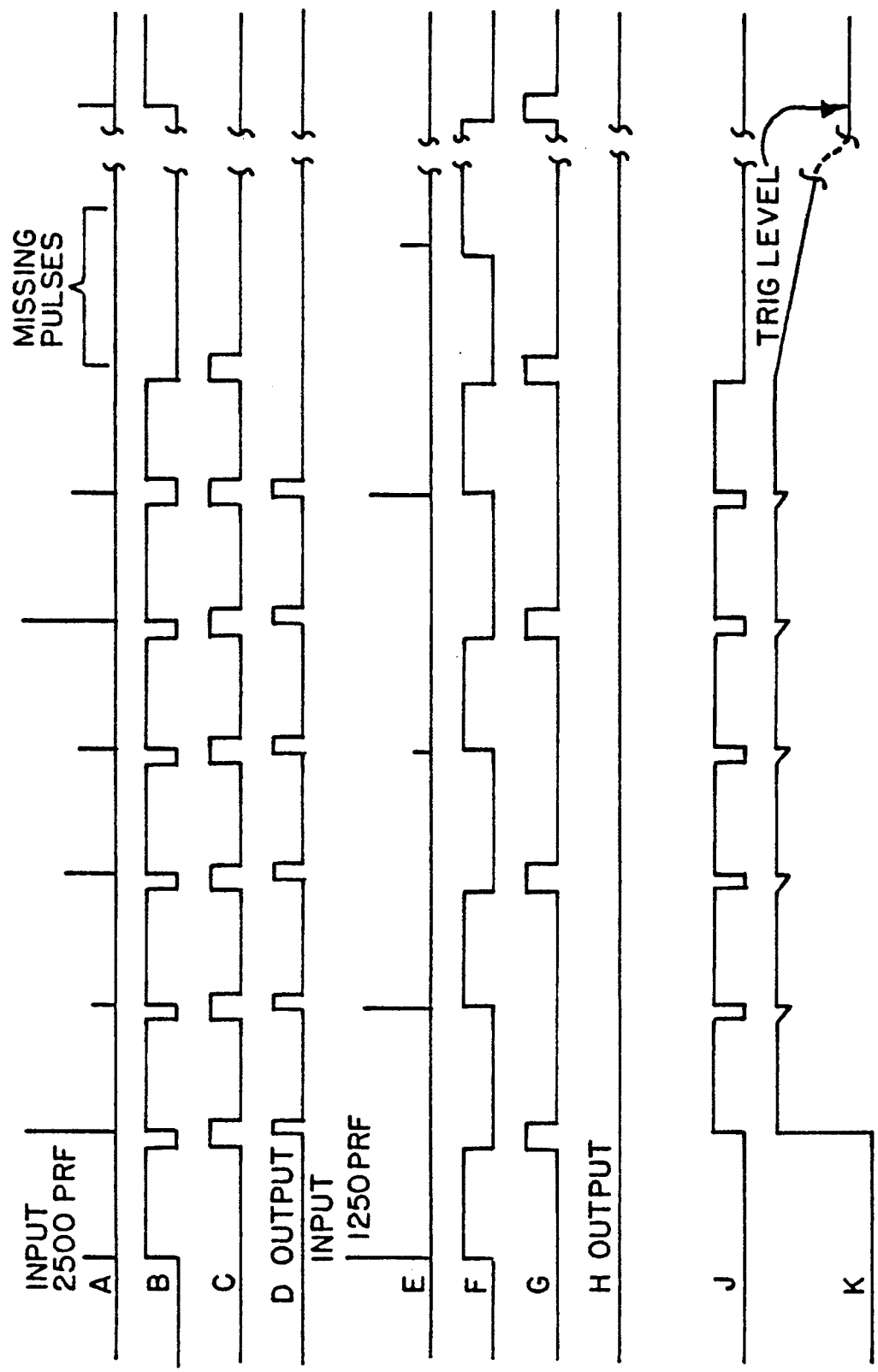
FIG. 3 is a waveform diagram of the signals in the circuit of the invention.

The video from the normal output of the crystal video receiver is applied to ache-shot multivibrator 52 with a quasi-stable state of approximately 375 μs as shown in waveform B (FIG. 3). The trailing edge of this waveform is used to trigger another one-shot multivibrator 54 with a time of approximately 40 μs as shown in waveform C (FIG. 3). The 40 μs gate is then used as one input to an AND gate 56. The other input is the waveform shown in B of FIG. 3. An output from this AND gate occurs only if the incoming PRF is between 2400 and 2600 PPS.

In the event a PRF is received which is not within the desired PRF range (such as waveform E, which is 1250), the events depicted in waveforms F, G, and H take place. Note that there is no output with this PRF, When the correct PRF is received, an additional 380 microsecond one-shot multivibrator 58 is triggered and the output is used to illuminate an indicator light 60. An additional output is fed to the center sector logic circuitry. This waveform is shown in waveform J, FIG. 3. The 380 μs input to the center sector logic circuitry is integrated at 62 resulting in waveform K. This integrated waveform is applied to a Schmitt trigger 64 which is designed to switch when the incoming pulses have been missing for 11.5 milliseconds. When reception of pulses resumes, the integrator charges rapidly (within one or two pulse periods), and the Schmitt trigger switches back to the ON condition. This change of state occurs essentially at the beginning of the live time period.

The output from the Schmitt trigger initiates a 22.5 millisecond one-shot multivibrator 66. The trailing edge 68 of the 22.5 millisecond pulse initiates a 5 millisecond one-shot multivibrator 68, the output of which is one input to an AND gate 70. The result of this action is to produce a gating signal which is time coincident with the center of the scanning live time. If an aircraft is located in the center of the tracking sector, the main beam of the search radar will be received at the same time the above-mentioned gate pulse is generated.

To receive the main beam under all conditions, an AGC amplifier 72 is used which receives its input from the second stage of the crystal-video receiver (FIG. 1). The output of the AGC amplifier is box-car detected and filtered to provide a varying DC feedback voltage for gain control. Open loop gain of the AGC amplifier is approximately 50 db. The time constant of the filtered DC is made sufficiently long (several scans) to insure that the gain of the AGC amplifier is due to the largest received signal (the main beam) and not the average received signal. The overall result is a nonsaturated video output which is depicted in FIG. 3. This gain-controlled video is then box-car detected (74) with a relatively short time constant, resulting in a voltage waveform which is the envelope of the main beam and having essentially constant amplitude. This wave form then switches a Schmitt trigger 76 which produces a fixed amplitude pulse. This pulse provides the second input to the AND gate 70. The output ortho AND gate is applied to a stair-step counter 78 which requires four pulses in order to trigger another Schmitt trigger 80. The output of the Schmitt trigger is used to illuminate the sector indicator 82.

In addition to merely indicating to an observer that the aircraft is in the search sector, it is possible to provide the means which will give an indication as to the position of an aircraft in the TWS search sector. Referring again to FIG. 2, A Schmitt trigger 64 fires after the integration (62) of the TWS radar dead time of, for example, eleven milliseconds, and a second Schmitt trigger 76 fires when the box-car video 74 exceeds a preset threshold. In the sector position indicator circuit, the Schmitt trigger that fires on the box-car video (mainbeam) in turn triggers a six milliseconds delay one-shot multivibrator 83. This multivibrator then sets one side of a bistable multivibrator 84. The other side of the bistable circuit is then reset by the Schmitt trigger that fired at the end of the TWS radar dead time. This bistable multivibrator drives a milliamp meter 86, the deflection of which is directly proportional to the aircraft sector position. The following explanation should clarify the six millisecond one-shot. If $B_T$=time that the TWS radar is radiating $D_r$=time that the TWS radar is not radiating, then
for the meter to read center scale when the aircraft is centered in the TWS radar sector, $$\frac{R_T}{2} + K = \frac{R_T + D_T}{2}$$

or

-continued $$K = \frac{R_T + D_T}{2} - \frac{R_T}{2} = \frac{D_T}{2} = \frac{11.5}{2} = 5.75 \approx 6 \text{ ms}$$

By proper interpretation of the sector position meter, one can determine if he is in the TWS radar sector, and also if he is being tracked. This latter information is learned from the fact that the indicator needle remains constant when the aircraft is being tracked.

Figure 4:
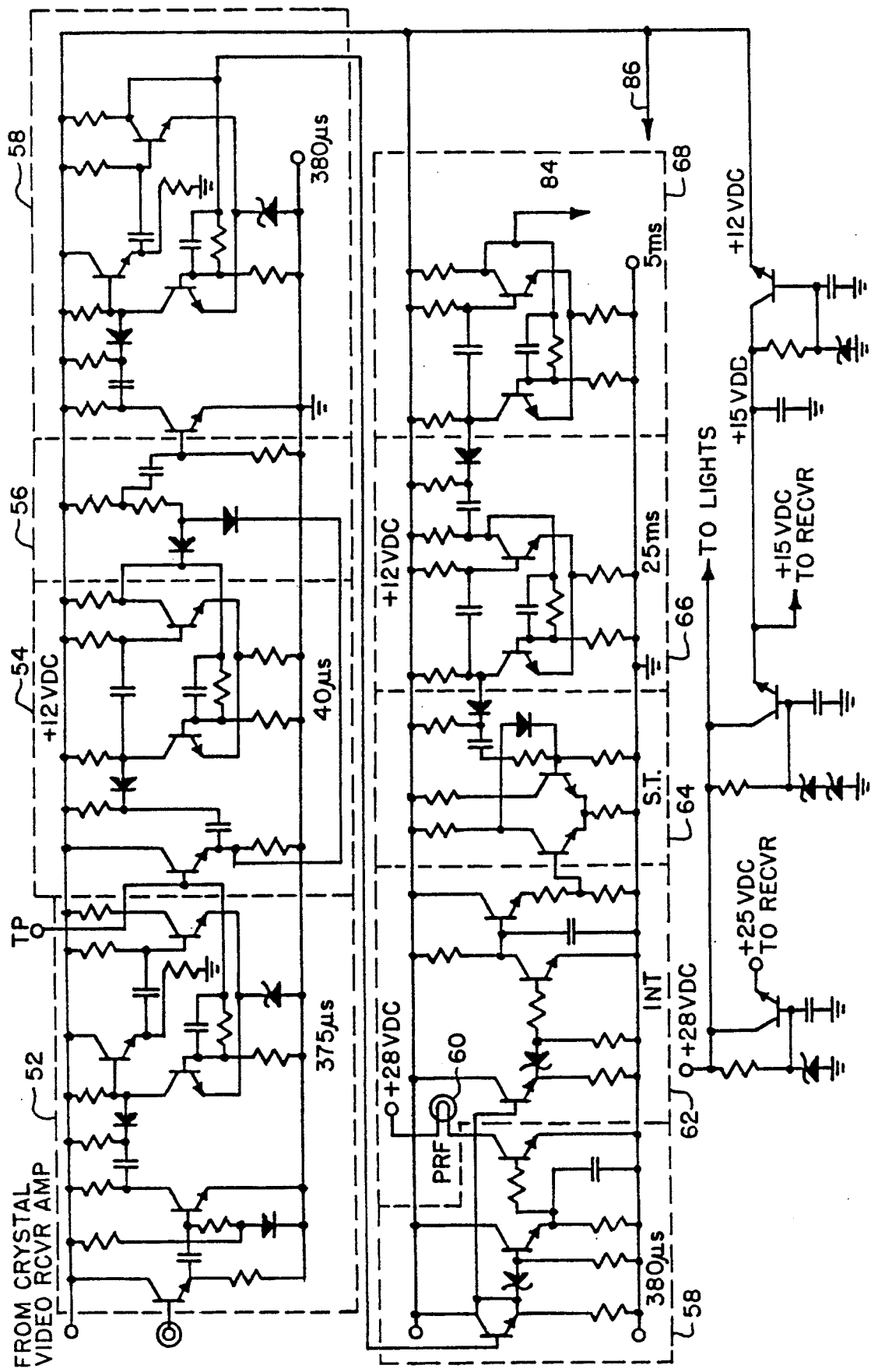
FIG. 4 is a detailed circuit diagram of an embodiment of the invention.
Figure 5:
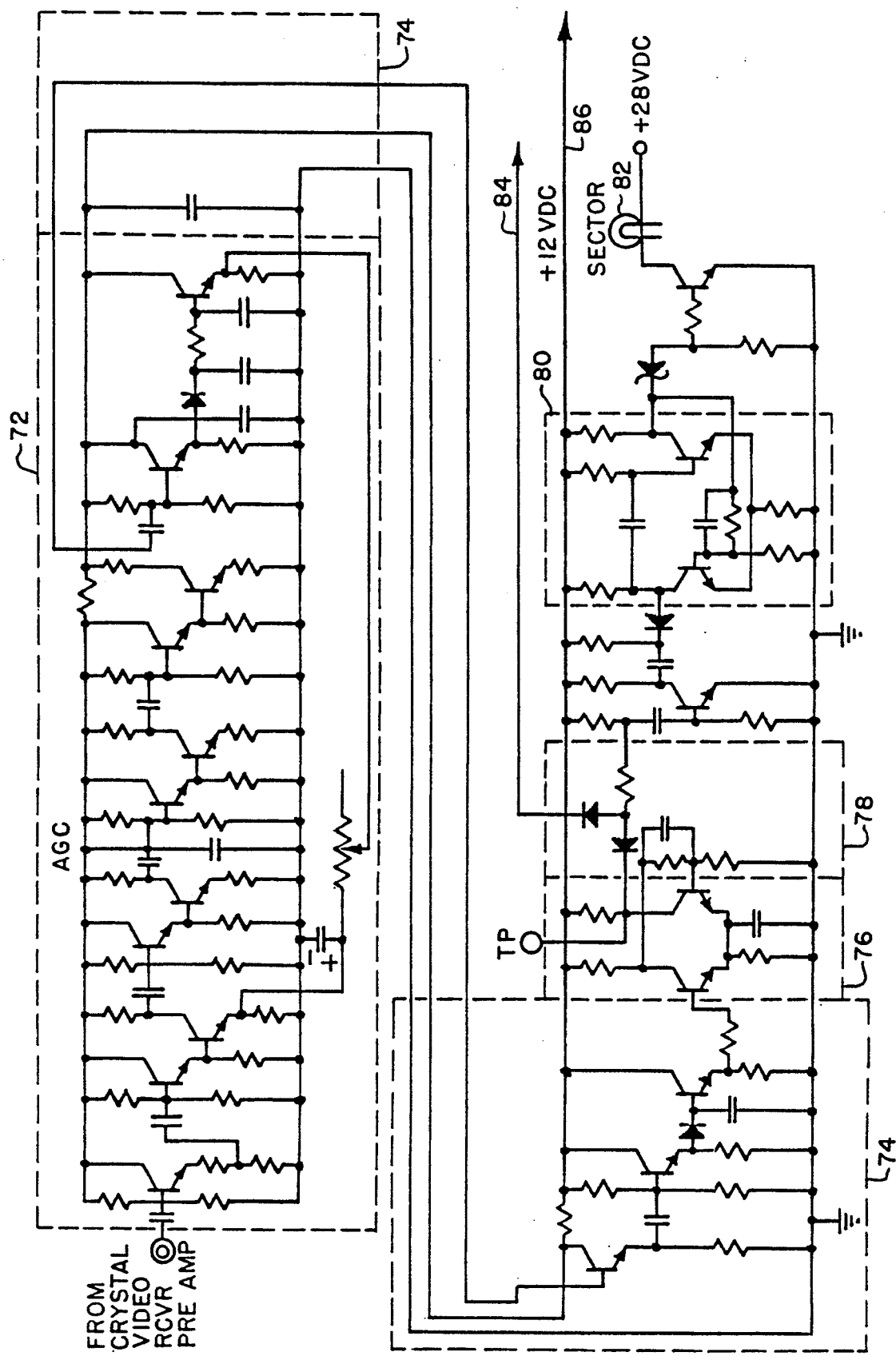
FIG. 5 is a continuation of the circuit diagram of FIG. 4.

In FIGS. 4 and 5 there is shown a detailed circuit diagram of the circuit shown generally in FIG. 2. In order to aid in the understanding of the invention, the boxes of FIG. 2 will be shown over the diagram in these figures.

The signal from the crystal video receiver 50 (FIG. 2) enters the one-shot multivibrator 52, the second one-shot multivibrator 54, gate 56 and the 380 μs multivibrator 58, and activates the PRF indicator 60. Part of the signal from the PRF logic is fed to the integrator 62, the Schmitt trigger 64, the first one-shot multivibrator 66, thence to the second one-shot multivibrator 68 and to the AND gate 70.

The signal from the crystal video receiver (24 in FIG. 2) enters the automatic gain controlled amplifier 72, is detected by the box-car detector 74 and enters the Schmitt trigger 76. From there it enters the AND gate 70 and is applied to a stair-step counter which triggers the Schmitt trigger 80 causing the sector indicator 82 to light.

In the circuit the lines designated by 84 and the lines designated by 86 are connected to form a complete circuit.

While the instant invention has been described with regard to a specific embodiment, there are variations which may be made as an improvement thereon. One such improvement includes the substitution of a super-heterodyne receiver for the crystal video receiver to provide an indication of when the device is in a track-while-scan sector and to further utilize these same signals to operate a specially annotated meter to indicate the angular position of the device in a track-while-scan sector.

Although the invention has been described with reference to a particular embodiment, it will be understood to those skilled in the art that the invention is capable of a variety of alternative embodiments within the spirit and scope of the appended claims.

We claim:

1. An airborne radar warning receiver comprising in combination: a circuit means for determining an increase in received pulse rate frequency including an antenna, a frequency filter connected to the antenna, a receiver means connected to the filter, logic circuit means connected to the receiver and visual indicating means connected to the logic circuit means; a circuit means for determining the center of a search scan sector including an antenna, a frequency filter, a receiver means and automatic gain controlled amplifier connected in series, and a logic circuit means for receiving a signal from the gain controlled amplifier and a signal from the pulse rate frequency logic and a visual indicating means connected to the logic means; and a circuit means for indicating the presence of a particular radar frequency including a frequency filter, a signal receiving means and logic circuit means connected in series and a visual indicating means connected to the logic circuit.

2. An airborne radar warning receiver according to claim 1 wherein:
   the receiver means are crystal video receivers.

3. An airborne radar warning receiver according to claim 1 wherein:
   the receiver means are super-heterodyne receivers.

4. An airborne radar warning receiver according to claim 1 wherein:
   the visual indicating means are lights.

5. An airborne radar warning receiver according to claim 1 wherein:
   the visual indicating means for the sector locator circuit is a meter.

6. An airborne radar warning receiver according to claim 1 wherein:
   the antenna utilized in the pulse rate frequency detector circuit and the sector locator circuit is a quarter-wave vertically polarized stub antenna.

7. An airborne radar warning receiver according to claim 1 wherein:
   the antenna utilized in the pulse rate frequency detector circuit and the sector locator circuit is a horizontally polarized stub antenna.

* * * * *